(12) United States Patent
Lestician

(10) Patent No.: US 9,788,402 B2
(45) Date of Patent: Oct. 10, 2017

(54) ENHANCED VARIABLE CONTROL, CURRENT SENSING DRIVERS WITH ZETA SCAN

(71) Applicant: Guy J. Lestician, E. Stroudsburg, PA (US)

(72) Inventor: Guy J. Lestician, E. Stroudsburg, PA (US)

(73) Assignee: LUXOR SCIENTIFIC, INC, Marshall's Creek, PA (US)

( * ) Notice: Subject to any disclaimer, the term of this patent is extended or adjusted under 35 U.S.C. 154(b) by 0 days.

(21) Appl. No.: 14/545,066

(22) Filed: Mar. 23, 2015

(65) Prior Publication Data

US 2016/0286635 A1    Sep. 29, 2016

(51) Int. Cl.
| H05B 33/08 | (2006.01) |
| H05B 41/285 | (2006.01) |
| H05B 41/282 | (2006.01) |
| H05B 37/02 | (2006.01) |

(52) U.S. Cl.
CPC ..... *H05B 41/2858* (2013.01); *H05B 33/0809* (2013.01); *H05B 33/0827* (2013.01); *H05B 33/0887* (2013.01); *H05B 37/0272* (2013.01); *H05B 37/0281* (2013.01); *H05B 41/2822* (2013.01); *H05B 41/2824* (2013.01); *H05B 41/2827* (2013.01); *Y02B 20/42* (2013.01)

(58) Field of Classification Search
CPC ............ H05B 33/0815; H05B 33/0818; H05B 33/0884; H05B 33/0809; H05B 33/0848; H05B 33/0851; H05B 41/3925; H05B 41/391; H05B 41/2828; H05B 41/2858; H05B 33/0803

USPC ................................ 315/294, 307, 224, 121
See application file for complete search history.

(56) References Cited

U.S. PATENT DOCUMENTS

| 4,392,087 A | 7/1983 | Zansky |
| 4,876,485 A | 10/1989 | Fox |
| 5,039,920 A | 8/1991 | Zonis |
| 5,105,127 A | 4/1992 | Lavaud et al. |
| 5,287,040 A * | 2/1994 | Lestician ........... H05B 41/3925 315/119 |
| 5,323,090 A | 6/1994 | Lestician |
| 5,612,597 A | 3/1997 | Wood |
| 7,312,582 B2 | 12/2007 | Newman, Jr. et al. |
| 7,952,293 B2 | 5/2011 | Kelly |
| 8,441,210 B2 | 5/2013 | Shteynberg et al. |
| 9,320,093 B2 * | 4/2016 | Tikkanen ........... H05B 33/0815 |

(Continued)

*Primary Examiner* — Douglas W Owens
*Assistant Examiner* — Syed M Kaiser
(74) *Attorney, Agent, or Firm* — Deirdra M. Meagher; Kenneth P. Glynn

(57) ABSTRACT

An electronic lighting system with a driver includes transformers that are dedicated to particular lamp receptacles that include interloper diode and resistor sets that fine tune the functioning of the driver. A buck converter and power factor correction, and a zeta scan are included. A comparator circuitry receives an external control signal and compares it to feedback from the output side of the circuitry, and thereby controls a Pulse Width Modulation (PWM) circuitry, which cooperates with feedback-based MOSFETs and a MOSFET gate driver circuit. This aids in dimming capabilities, recognizes and corrects for outages and recognizes and corrects for changes in the different size lamps that a user may install.

20 Claims, 6 Drawing Sheets

(56) References Cited

U.S. PATENT DOCUMENTS

| | | | | |
|---|---|---|---|---|
| 2004/0095081 A1* | 5/2004 | Kernahan | .......... | H05B 41/3927 |
| | | | | 315/307 |
| 2010/0060175 A1* | 3/2010 | Lethellier | .......... | H05B 33/0815 |
| | | | | 315/164 |
| 2010/0096995 A1* | 4/2010 | Kishimoto | ......... | H05B 41/2985 |
| | | | | 315/119 |
| 2010/0164579 A1* | 7/2010 | Acatrinei | ............ | H02M 1/4208 |
| | | | | 327/172 |
| 2011/0204820 A1* | 8/2011 | Tikkanen | .......... | H05B 33/0815 |
| | | | | 315/294 |
| 2012/0280637 A1* | 11/2012 | Tikkanen | .......... | H05B 33/0803 |
| | | | | 315/294 |
| 2015/0257223 A1* | 9/2015 | Siessegger | ......... | H05B 33/0818 |
| | | | | 315/186 |
| 2015/0289331 A1* | 10/2015 | Chen | ................. | H05B 33/0851 |
| | | | | 315/186 |
| 2015/0312985 A1* | 10/2015 | Chappell | ................ | H02J 7/025 |
| | | | | 315/210 |

* cited by examiner

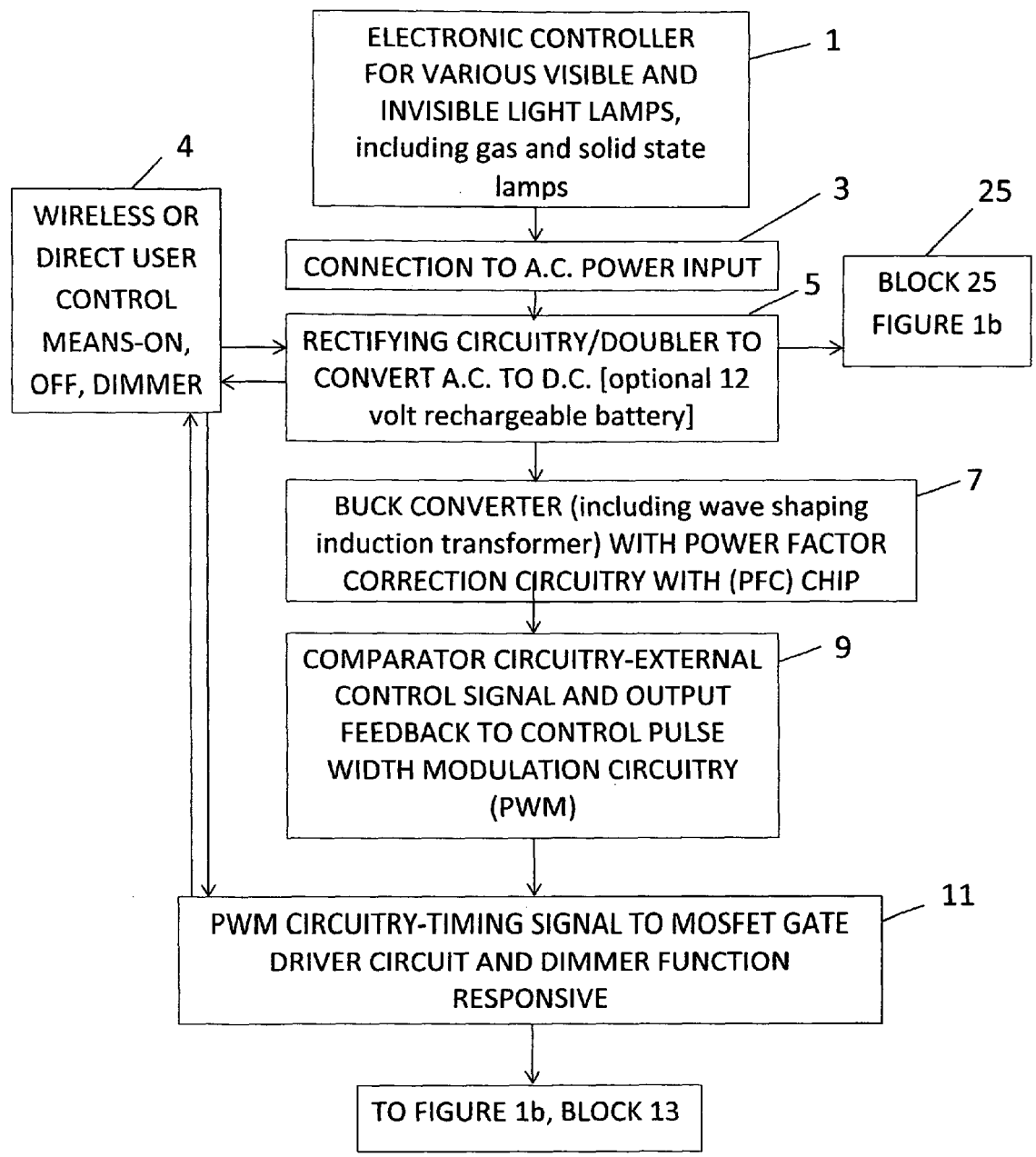

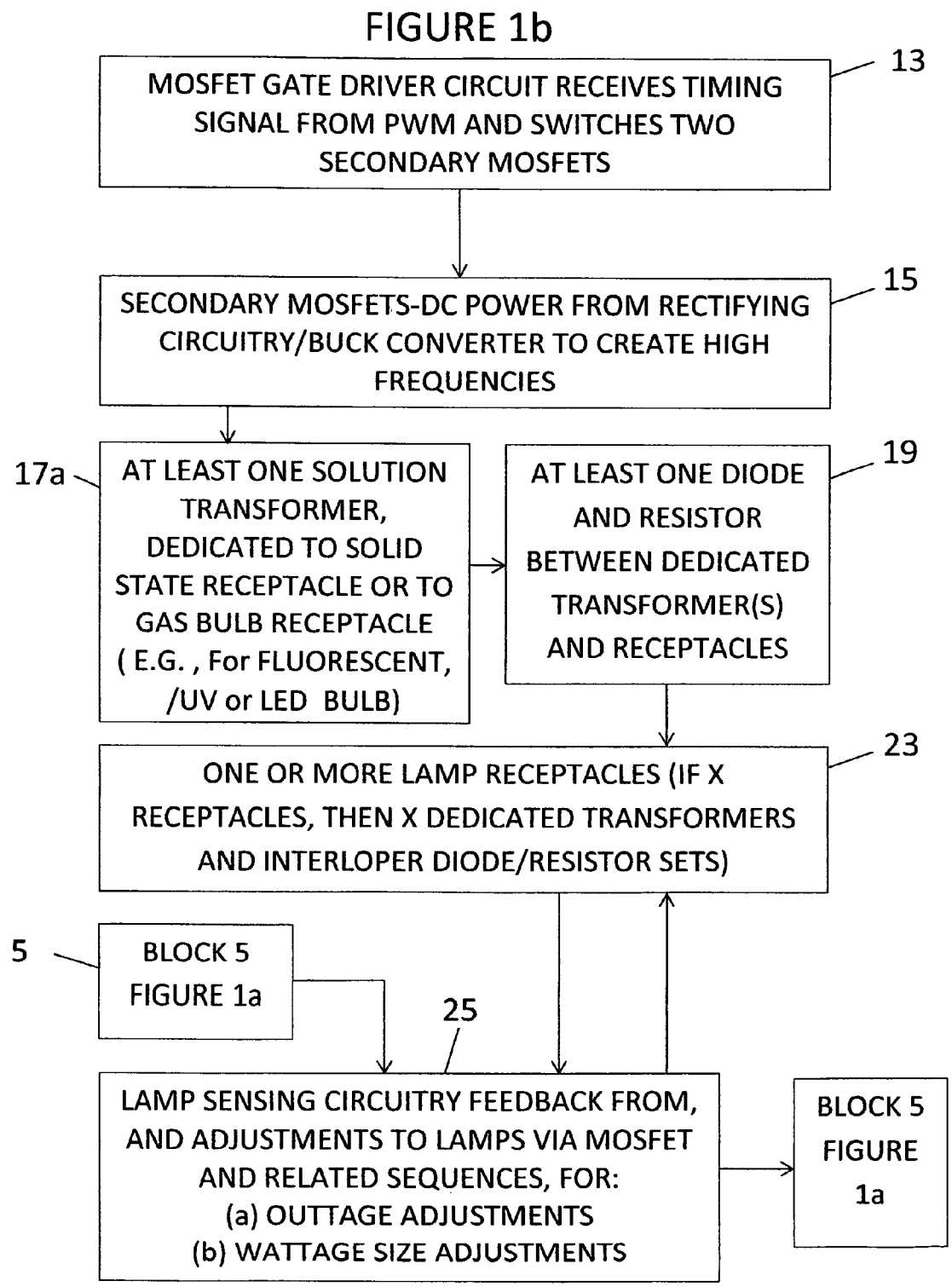

FIGURE 1c

THE BELOW FRAME 17b REPLACES FRAME 17a ABOVE, IN SOME PREFERRED EMBODIMENTS:

17b → AT LEAST TWO SOLUTION TRANSFORMERS, AT LEAST ONE DEDICATED TO SOLID STATE RECEPTACLE AND ONE TO GAS BULB RECEPTACLE

THE BELOW FRAME 27 IS ADDED TO FIGURE 1A AND 1B COMPONENTS, PER FIGURE 3 SCHEMATIC AND DESCRIPTION, IN SOME PREFERRED EMBODIMENTS:

27 → ZETA SCAN SEGMENT FOR WAVELENGTH CHOICES, FREQUENCY, SEQUENCE AND OTHER CHANGE CAPABILITIES

ENHANCED VARIABLE CONTROL, CURRENT SENSING DRIVERS WITH ZETA SCAN

REFERENCE TO RELATED APPLICATIONS

The present application is not related to any pending or issued United States of America or foreign patent or patent application.

BACKGROUND OF INVENTION a. Field of Invention

The present invention is an electronic driver (sometimes referred to as a ballast or controller) and lamp system for controlling the power to one or more gas discharge lamps. It is directed to the problems of present ballasts and gas discharge lamps which waste energy through excess heat generation, and which lack control options and which have inherent problems associated with the filaments in standard fluorescent lamps. The present invention driver is able to power one or more gas discharge lamps, such as fluorescent lamps, without standard filaments. The filaments are replaced with unconnected single electrodes. The present invention driver is also able to light LED tubes that may, for example, replace T8 and T5 fluorescent lamps, even at 8 feet in length, for example.

Fluorescent lamps are used extensively throughout office buildings, schools, hospitals, industrial plants for lighting, as plant grow lights for outdoor lighting, and for many other uses. The power to these lamps is controlled by a variety of present available ballasts which have inherent problems. While standard fluorescent lamps with standard ballasts and less sophisticated electronic ballasts offer some benefits over other lighting techniques, such as lower energy use for comparable light output, these ballasts still waste energy through excessive heat generation, they lack the features available with the present invention and the life of the lamp is limited because of failure of the filaments. Standard ballasts use bulky energy wasting transformers to create a high voltage, low frequency signal to excite the lamp filaments creating thermionic emissions. The present invention uses a low voltage, high frequency sensing signal to cause the electrodes to energize. Existing ballasts require specific impedance matching components that are limited to a specific lamp design. The present invention can power a wide range of lamp sizes without modification, as well as different types of lamps or mixtures of different types of lamps. Examples of different types and mixtures include T5, T8, and 0.325 milliamp to 1.5 amp VHO lamps.

Using the present invention, lamps will burn cooler, last longer and produce a brighter light while using less electricity. The present invention also has a more sophisticated level of control then is available from the present state of the art. It can dim the lamps, delay power-up to improve lamp life, sense when a lamp is missing and respond accordingly by reducing power or shutting down completely, and it can be controlled remotely or by a programmable unit. The present system is also able to light its lamps in extremely low temperature because there is no need to heat the filaments or to vaporize the mercury in the fluorescent lamps. In addition, the preferred zeta scan component enables preprogramming to illuminate selected wavelengths and to vary their intensity over time and to even set up sequential selected wave length intensity increases and decreases, as a user may desire, such as with an external or wireless device.

b. Description of Related Prior Art

The following patents are of interest to the present invention technology:

U.S. Pat. No. 5,105,127 discloses a ballast for control of a two-pin fluorescent lamp. However, this device utilizes a complex system of supplying square pulses comprised of a high frequency signal. These "pulses" are then modulated to achieve dimming.

U.S. Pat. No. 5,039,920 also discloses a ballast for control of a two-pin fluorescent lamp. This device utilizes an even more complex system to supply a wave with a "noncontinuous sinusoidal shape" to the lamps. Effectively these lamps see a single cycle of a sine wave followed by a "notch" or dead zone and then another single cycle.

U.S. Pat. No. 4,392,087 discloses a device to power two-pin fluorescent tubes but requires a tuning capacitor and hence can not accept different lamps loads without modification. Further, dimming is accomplished by decreasing voltage.

U.S. Pat. No. 4,876,485 discloses a device which, while used to power standard fluorescent lamps, teaches the ability to power such lamps with an open filament. However, the frequency is fixed and thus cannot be changed to dim the lamps and cannot automatically be adjusted to match the lamp load.

U.S. Pat. No. 5,287,040 to Guy Lestician, the present inventor herein, is directed to an electronic ballast device for the control of gas discharge lamps. The device is comprised of a housing unit with electronic circuitry and related components. The device accepts a.c. power and rectifies it into various low d.c. voltages to power the electronic circuitry, and to one or more high d.c. voltages to supply power for the lamps. Both the low d.c. voltages and the high d.c. voltages can be supplied directly, eliminating the need to rectify a.c. power. The device switches a d.c. voltage such that a high frequency signal is generated. Because of the choice of output transformers matched to the high frequency (about 38 kHz) and the ability to change frequency slightly to achieve proper current, the device can accept various lamp sizes without modification. The ballast can also dim the lamps by increasing the frequency. The device can be remotely controlled.

U.S. Pat. No. 5,323,090 to Guy Lestician, the present inventor herein, is directed to an electronic ballast system including one or more gas discharge lamps which have two unconnected single electrodes each. The system is comprised of a housing unit with electronic circuitry and related components and the lamps. The system accepts a.c. power and rectifies it into various low d.c. voltages to power the electronic circuitry, and to one or more high d.c. voltages to supply power for the lamps. Both the low d.c. voltages and the high d.c. voltages can be supplied directly, eliminating the need to rectify a.c. power. The device switches a d.c. voltage such that a high frequency signal is generated. Because of the choice of output transformers matched to the high frequency (about 38 kHz) and the ability to change frequency slightly to achieve proper current, the device can accept various lamp sizes without modification. The ballast can also dim the lamps by increasing the frequency. The device can be remotely controlled. Because no filaments are used, lamp life is greatly extended.

U.S. Pat. No. 5,612,597 to Wood describes a circuit and method for driving a load such as a gas discharge illumination device from an ac main supply with a high power factor. The circuit includes a pair of electronic switches arranged in a half bridge configuration and a self oscillating driver circuit having two outputs for driving respective ones of the electronic switches, the electronic switches being coupled across a dc bus voltage and having a switched output coupled to the load. The circuit further includes a voltage regulator circuit coupled across the dc bus voltage and coupled to the self oscillating driver circuit, the voltage regulator circuit maintaining the dc bus voltage within a preset range and preventing the dc bus voltage from exceeding the range if the load is removed or becomes an open circuit. The voltage regulator preferably is a boost regulator switching an inductance. The circuit is particularly suitable for driving gas discharge illumination devices, e.g., fluorescent lamps, at a high power factor with minimum instability of the dc bus. U.S. Pat. No. 7,312,582 B2 to Newman et al An electronic ballast for driving at least one lamp comprising a rectifying circuit operatively connectable to an AC line; a current drawing circuit connected across said rectifying circuit; and an inverter circuit connected to said rectifying circuit that supplies a lamp current to said at least one lamp; wherein said current drawing circuit draws current from said AC line when the instantaneous voltage of said AC line nears zero to reduce the total harmonic distortion of the input current drawn by said ballast. U.S. Pat. No. 7,952,293 B2 to Kelly Power describes factor correction and driver circuits and stages. More particularly, power factor correction circuits are described that utilize an auxiliary inductor winding for power regulation. Driver circuits configured for electrical loads such as series arrangements of light emitting diodes are also described. An exemplary embodiment of a driver circuit can implement a comparator and/or a voltage regulator to allow for improved output current uniformity for high-voltage applications and loads, such as series configurations of LEDs. Embodiments of PFC stages and driver stages can be combined for use as a power supply, and may be configured on a common circuit board. Power factor correction and driver circuits can be combined with one or more lighting elements as a lighting apparatus.

U.S. Pat. No. 8,441,210 B2 to Shteynberg et al provides an apparatus, system and method for power conversion to provide power to solid state lighting, and which may be coupled to a first switch, such as a dimmer switch. An exemplary system for power conversion comprises: a switching power supply comprising a second, power switch; solid state lighting coupled to the switching power supply; a voltage sensor; a current sensor; a memory; a first adaptive interface circuit to provide a resistive impedance to the first switch and conduct current from the first switch in a default mode; a second adaptive interface circuit to create a resonant process when the first switch turns on; and a controller to modulate the second adaptive interface circuit when the first switch turns on to provide a current path during the resonant process of the switching power supply.

Thus, while there is extensive prior art in the ballast and gas-based and solid state lamp areas, none teaches an electronic ballast to power and control these lamps in the manner set forth herein. Notwithstanding the prior art, the present invention is neither taught nor rendered obvious thereby.

SUMMARY OF THE INVENTION

The present invention is directed to an electronic ballast system including one or more gas discharge lamps which have two unconnected single electrodes each. The system is comprised of a housing unit with electronic circuitry and related components and the lamps. The system accepts a.c. power and rectifies it into various low d.c. voltages to power the electronic circuitry, and to one or more high d.c. voltages to supply power for the lamps. Both the low d.c. voltages and the high d.c. voltages can be supplied directly, eliminating the need to rectify a.c. power. The device switches a d.c. voltage such that a high frequency signal is generated. Because of the choice of output transformers matched to the high frequency (about 38 kHz) and the ability to change frequency slightly to achieve proper current, the device can accept various lamp sizes without modification. The ballast can also dim the lamps by increasing the frequency. The device can be remotely controlled. Because no filaments are used, lamp life is greatly extended.

Thus, the present invention enhanced variable control, current sensing electronic driver is for providing light from gas-based light bulbs as well as solid state lamps, wherein the driver is programmable and auto-adjustable for different wattages to permit use of different size and intensity lamps therewith. This present invention driver has power factor correction, surge protection, current sensing with current adjustment, and dimming capabilities, and does not require mercury for fluorescent light ignition. This present invention driver includes: (a) a housing unit to mount electronic circuitry and related components; (b) electronic circuitry mounted on the housing unit, which includes: (i) connection means for connecting and applying a.c. power input to the circuitry; (ii) user control means for switching lamps on and off and dimming, thereby controlling the circuitry; (iii) rectifying circuitry to convert a.c. power input to a plurality of d.c. outputs, including one or more low voltage outputs, and including a doubler circuit for generation of high frequency voltages; (iv) buck convertor that includes a wave-shaping induction transformer component, with power factor correction circuitry, including at least one power factor correction chip; (v) comparator circuitry which receives an external control signal and compares it to feedback from the output side of the circuitry, and thereby controls a Pulse Width Modulation (PWM) circuitry; (vi) the PWM circuitry which sends at least timing and frequency signals to a MOSFET gate driver circuit, and the PWM circuitry being functional to respond to dimming input of the user control means; (vii) the MOSFET gate driver circuit which receives the timing signal from PWM circuitry and supplies switching control to at least two secondary MOSFETs; (viii) the at least two secondary MOSFETs, which receive d.c. power from the rectifying circuitry and its doubler circuit and which are controlled by the MOSFET gate driver circuitry to output high frequency voltages; (ix) at least one isolation transformer, selected from the group consisting of a gas-bulb dedicated isolation transformer, a solid state lamp isolation transformer, and combinations thereof, with the outputs of the MOSFETs connected to inputs to the at least one transformer for driving at least one corresponding lamp; (x) at least one diode and one resistor located between the at least one isolation transformer and a single lamp receptacle connection to which it is dedicated; and, (xi) lamp sensing circuitry receiving input from the rectifying circuitry to detect lamp wattage and to also having a fault detector with a shut-down to separately detect lamp outage, and connected to adjustment circuitry to adjust for both wattage size and lamp outage, the lamp sensing circuitry to adjust power as needed to recognize and adjust to wattage requirements of different lamp sizes, and separately to at least partially decrease power when at least one lamp is experiencing outage.

In some embodiments of the present invention enhanced variable control, current sensing electronic driver, there is further a control means to remotely control the switching on and off. They may also include means to remotely control the driver such that the lamps may be dimmed by controlling the PWM circuitry. Additionally, in some embodiments, there is means to control the driver by a programmable timer and dimmer.

In some embodiments of the present invention enhanced variable control, current sensing electronic driver, each of the power factor correction circuitry and the current sensing circuitry has at least one ground connected thereto.

In some embodiments of the present invention enhanced variable control, current sensing electronic driver, the at least one isolation transformer is a solid state lamp-dedicated isolation transformer, which receives d.c. power from the rectifying circuit, and which is controlled by the MOSFET gate driver circuit. In some embodiments of the present invention enhanced variable control, current sensing electronic driver, the solid state receptacle is connected to the solid state dedicated isolation transformer, and the at least one diode and one resistor is located between the solid state dedicated isolation transformer and the solid receptacle. In some embodiments of the present invention enhanced variable control, current sensing electronic driver, the solid state receptacle contains an LED lamp.

In some embodiments of the present invention enhanced variable control, current sensing electronic driver, the isolation transformer is a gas-bulb dedicated isolation transformer, a gas bulb receptacle is connected to the gas-bulb dedicated isolation transformer, and the at least one diode and one resistor is located between the gas-bulb dedicated isolation transformer and the gas bulb receptacle. In some embodiments of the present invention enhanced variable control, current sensing electronic driver, the gas bulb receptacle contains a fluorescent bulb. In some embodiments of the present invention enhanced variable control, current sensing electronic driver, the gas bulb receptacle contains an ultraviolet bulb. In some embodiments of the present invention enhanced variable control, current sensing electronic driver, the gas bulb receptacle contains an infrared bulb.

In some embodiments of the present invention enhanced variable control, current sensing electronic driver, there is further included an in-driver rechargeable 12 volt battery, alternating current power failure recognition, and 12 volt switch responsive to sensing alternating current power failure for 12 volt powering.

In some embodiments of the present invention enhanced variable control, current sensing electronic driver, there are two isolation transformers, one of which is a gas-bulb dedicated isolation transformer, a gas bulb receptacle is connected to the gas-bulb dedicated isolation transformer, and the at least one diode and one resistor is located between the gas-bulb dedicated isolation transformer and the gas bulb receptacle, and one of which is a solid state dedicated isolation transformer, and a solid state receptacle is connected to the solid state dedicated isolation transformer, and the at least one diode and one resistor is located between the solid state dedicated isolation transformer and the solid receptacle.

In some embodiments of the present invention enhanced variable control, current sensing electronic driver, there is further included a zeta scan component connected to the electronic circuitry mounted on the housing unit.

In some embodiments of the present invention enhanced variable control, current sensing electronic driver, the zeta scan component includes: (i) connection means for connecting and applying a.c. power input to the zeta scan component; (ii) at least one time and frequency controller; (iii) at least one input comparator connected to the time and frequency controller; (iv) at least one output comparator connected to the time and frequency controller; and, (v) a plurality of resistors and capacitors situated between the input comparator and the time and frequency controller, and at least one resistor and at least one capacitor situated between the time and frequency controller and the input comparator.

BRIEF DESCRIPTION OF THE DRAWINGS

The present invention will be more fully understood when the present specification is taken in conjunction with the appended drawings.

FIGS. 1a, 1b and 1c illustrate together a flow diagram of the driver of some preferred embodiments of the present invention;

DETAILED DESCRIPTION OF THE PRESENT INVENTION

Figure 2:
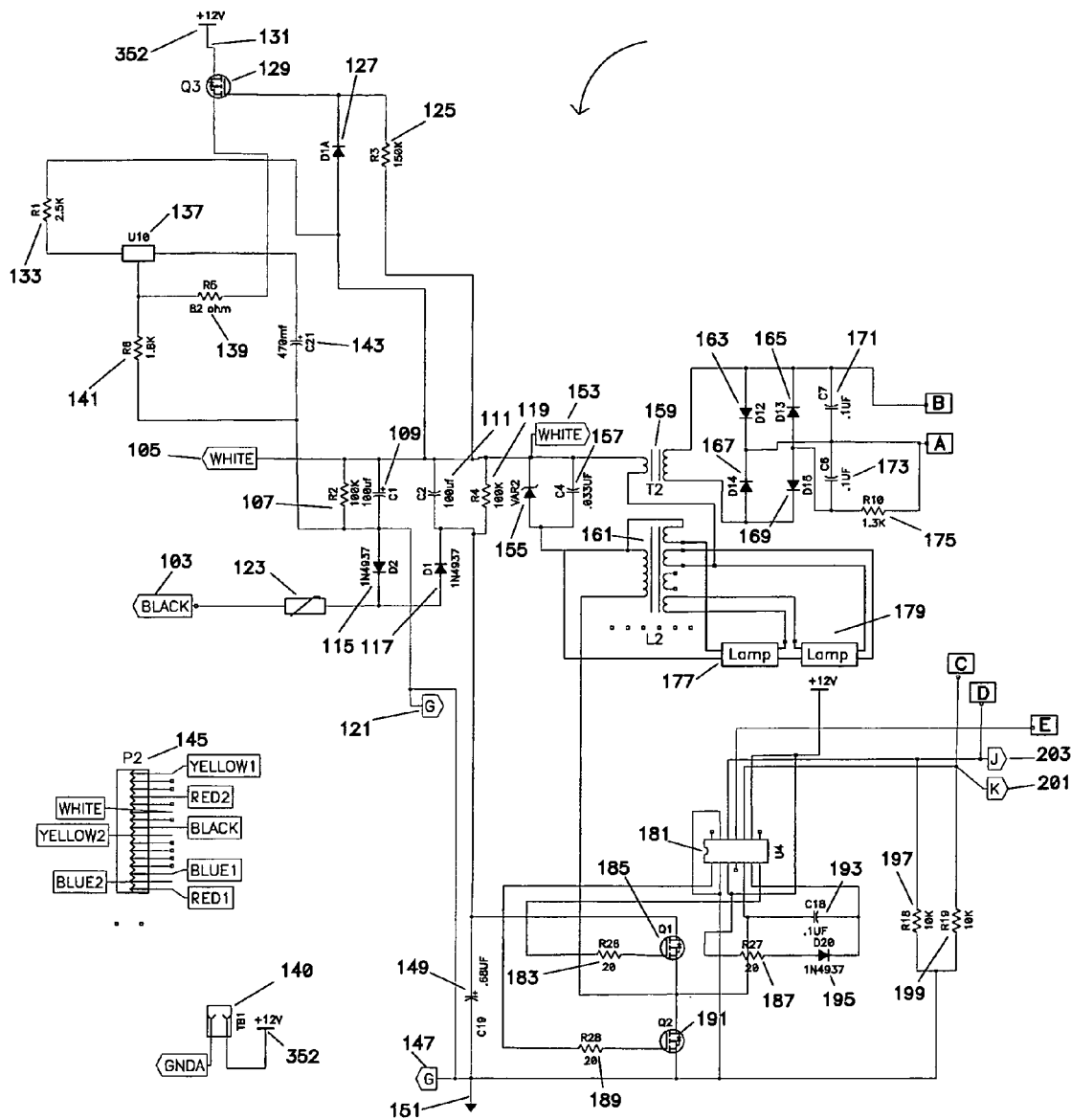
FIGS. 2, 3 and 4 illustrate together a schematic electrical diagram of the driver of some other preferred embodiments of the present invention that include the optional, but preferred, zeta scan component.

The present invention is directed to an electronic ballast system for the control of gas discharge lamps, such as fluorescent lamps, with unconnected single electrodes. The system is comprised of a ballast with electronic circuitry and related components. Although the present invention driver may be used to drive one or more gas-filled lamps, e.g., with unconnected single electrodes, the present invention drivers may also be used to drive solid state lighting, such as LEDs, as well as combination of types and sizes different lamps. The system accepts a.c. power and rectifies it into various low d.c. voltages to power the electronic circuitry, and by use of a doubler circuit, to one or more high d.c. voltages to supply power for the lamps. Both the low d.c. voltages and the high d.c. voltages can be supplied directly, eliminating the need to subsequently rectify a.c. power.

The high voltage d.c. power is applied to a plurality of MOSFET's (Metal Oxide Semiconductor Field Effect Transistors) which are controlled by a Pulse Width Modulation [P.W.M.] circuit which outputs two pulse trains 180 electrical degrees out of phase with each other. The PWM circuit controls switching circuitry which switches the MOSFET's such that a high frequency output is fed into one or more output transformers. Power from the output side of each of the transformers is fed to one or more lamps, e.g., fluorescent lamps which have two unconnected single electrodes. The PWM circuit thus controls the frequency which is supplied to the lamps.

The electrical characteristics of the transformers and the impedance of the circuit are chosen so that two important features are derived. The transformer operates in its "high frequency zone" where an increase in frequency, with voltage held nearly constant, will cause a decrease in output current. This allows for the ballast to dim the lamps by increasing the frequency. Secondly, in this region of operation, the reactance values of the transformer primary windings and the transformer secondary windings become significant. Because reactance is proportional to frequency, with a steady state operating frequency of about 38 kHz, these values are large. When different lamps are installed, the impedance of the lamp becomes part of the overall impedance reflected back to the MOSFET's. As lamp current increases, the resistance of the lamp decreases allowing for a further current increase. The overall impedance of the output transformers coupled with the impedance of the lamp with a frequency change acts to limit the lamp current. For any of the lamp sizes installed, a different, steady-state operating point for current and frequency is achieved when voltage is held nearly constant. It is the phenomenon of the transformer characteristics at the design nominal operating frequency which allow different lamp loads to be powered without rewiring or component change.

The high frequency of the voltage applied to the lamps striking the electrodes, causes the lamps to light. The present invention can dim its lamps by increasing the frequency inputted to the transformers thereby causing the output current to lower while the voltage is held constant. As the current decreases, the lamps dim. Thus, it can be seen that the selection of the operating frequency and corresponding frequency response of the output transformer are critical in the design of the present device.

If one or more lamps is removed, the device will sense this and either shut down completely or decrease output power to the remaining lamps as required.

The present device operates with a higher efficiency than conventional ballasts and higher than most electronic ballasts in large part because of the higher frequency and correspondingly smaller output transformers required. The lamps operated by this device will also last longer. The combination of having no filaments, and operating at a high frequency eliminate filament sputtering, and lower the voltage potential across the lamp so that the phosphorus in the lamp is depleted evenly from end to end. This will increase lamp life by as much as six times. Further, there is no filament to burn out causing lamp failure. The present system is also able to light its lamps at extremely low temperatures because there is no need to heat the filament as in previous systems.

The present invention involves an electronic ballast system including one or more gas discharge lamps, such as a fluorescent lamp which have two unconnected single electrodes.

The present invention ballast system may be utilized so as to include one or more gas discharge lamps, and in preferred embodiments, these gas discharge lamps are mercury-free gas discharge lamps, e.g. fluorescent lamps with no mercury vapor. For environmental reasons, the use of such lamps without mercury is important. These lamps may be inert gas lamps such as those with argon, neon, krypton or mixtures of these. In the case of, for example, neon lamps, these lamps previously required voltages of 2000 to 5000 volts to illuminate. However, with the ballast (driver) of the present invention, illumination has been achieved at voltages as low as 100 to 200 volts. Likewise, as mentioned, the present invention driver may be utilized for solid state lamps or combination of solid state and gas filled lamps.

The flow chart in FIG. 1 (shown in parts as FIGS. 1*a*, 1*b* and 1*c*) presents some embodiments of the present invention driver shown generally as frame 1. In this configuration there is an input of a.c. power 3 by means of a neutral lead and a hot lead (120 volts in the present embodiment). The device has the means to connect to the a.c. power 3. The a.c. power is input to the rectifier section 5. The rectifier 5 performs several functions. It rectifies the a.c. power 3 into various low d.c. voltages as required to power the electronic circuitry of the device 1. The rectifier section 5 also converts the a.c. power 3 into a high voltage d.c. power. This power is converted by the rectifier 5 and buck converter 7 from the a.c. voltage 3 into the d.c. power voltage. (In the present embodiment this may result in, for example, 375 volts d.c. relative to ground.)

The buck converter 7 includes a wave shaping inductor transformer that boosts the d.c. power supplies through the circuitry, including to the two secondary MOSFETs 15. The switching of the MOSFETs is controlled by gate driver circuitry 13 which in turn is controlled by the Pulse Width Modulated [PWM] circuit 11 in the control section described below. The MOSFETs are fired alternatively between the high voltage and ground, at 180 electrical degrees apart such that a high frequency output is fed into the input of one or more isolation transformers (17*a* or 17*b* in the present embodiments), which see a high frequency symmetrical, alternating signal relative to the neutral lead which, with filtering, approaches a sinusoidal wave.

The output(s) of the isolation transformer(s) 17*a* or 17*b*, are fed to the lamp(s) at receptacle(s) 23. One or more lamps may be connected to each isolation transformer included. Thus, four UV lamps can be connected to one isolation transformer and six LEDs connect to another isolation transformer. There is also an output of each of the transformers, which is connected to the comparator circuit 9. The comparator circuit 9 receives an externally generated control signal and compares this signal to feedback signals from the outputs of the isolation transformer(s) 17*a* or 17*b*. The control signal can turn the device on and off or can control dimming of the lamps. The comparator circuit 9 inputs timing signals to the PWM circuit 11. This PWM circuit 11 sends the timing signals to the MOSFET gate driver 13 as described above. By controlling the firing of the MOSFETs 15, the output of the MOSFETs 15 will be a voltage wave form of variable frequency. The high frequency voltage excites the electrodes of the gas filled lamps, e. g., mercury-free fluorescent lamps, causing them to light. By changing the frequency slightly, proper operating conditions will be achieved. By increasing the frequency, the lamps can be dimmed. By preventing the firing of the MOSFETs 15, the lamps are shut off completely.

There is a lamp sensing circuit 25 which can detect a fault. A power signal from the rectifier 5 and feedback signals from the lamps are input to the lamp sensing circuit 25 which senses the current draw of the lamps. The lamp sensing circuit 25 and the diode and resistor 19, located between the transformers and receptacles, work together to detects when a fault occurs. A fault occurs when one or more lamps are missing, causing a load change thereby changing the current draw of the load. If such a fault is detected, the fault detection causes the MOSFET gate driver 13 to change the signals to the MOSFET switching circuits so that power to the lamps is decreased or completely shut off. The alternative use of a single isolation transformer or two or more isolation transformers, enables specific product design to be dedicated to only gas lamps, dedicated only to solid state lamps frame 17*a*) or to be dedicated to both by using two or more isolation transformers (frame 17*b*). Also, as shown in FIG. 1*c* a preferred zeta scan may be added to enable controlling lamp outputs-wavelengths, frequencies, sequences of wavelengths over time, etc.

The following schematics represent one preferred embodiment of the present invention driver and variations and substations of components within the scope of the foregoing and following will be within the skill of the artisan.

Referring now to FIG. 2, a schematic diagram 101 shows details of a preferred embodiment of the present invention. Segments 103 and 105 show the 120V a.c. mains input. This a.c. signal is used in three ways: To supply high voltage bias to a power switching network, to be used in a 12V power supply, and to be used as an offset voltage in the transformer network.

Figure 3:
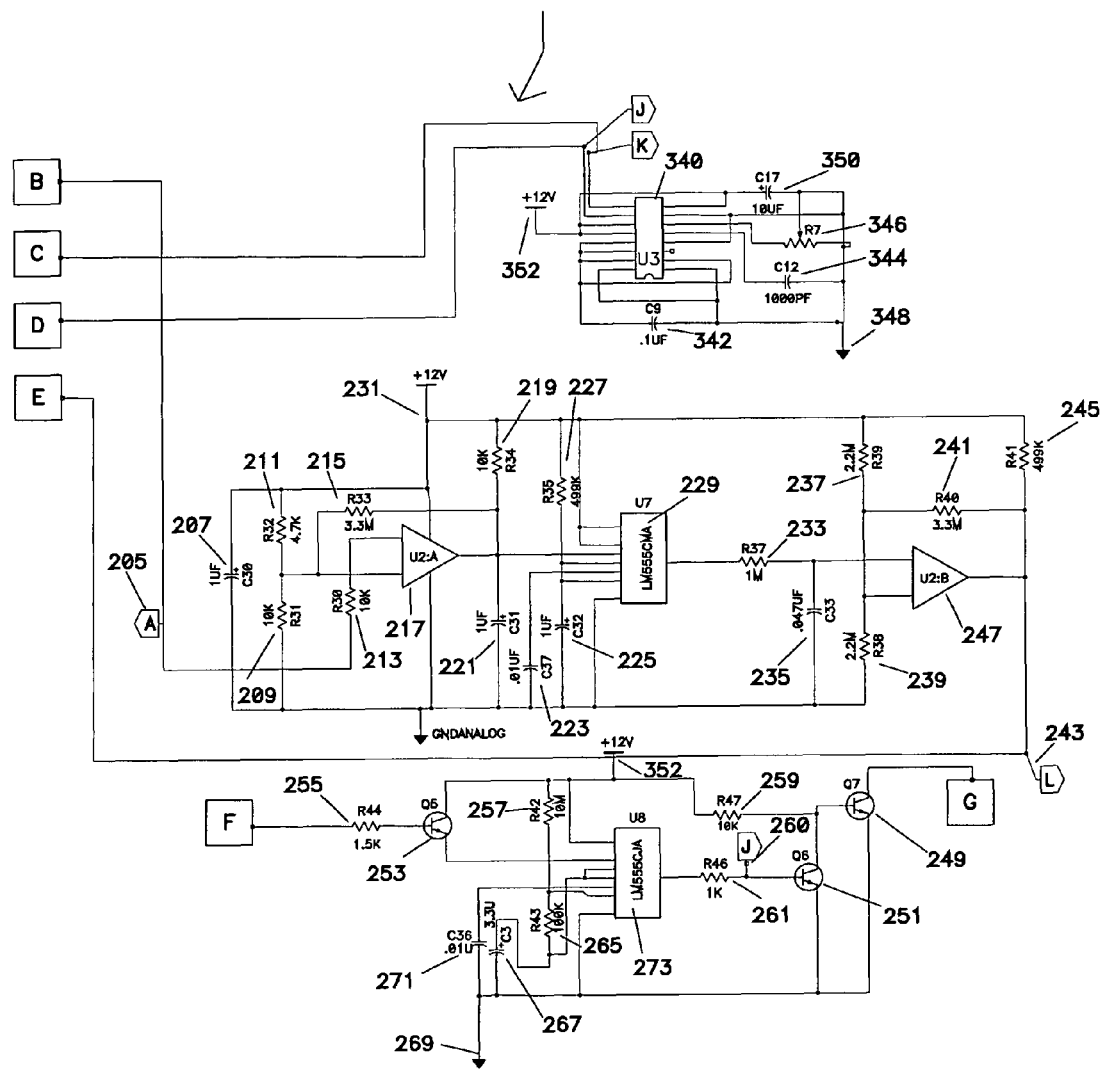
Figure 4:
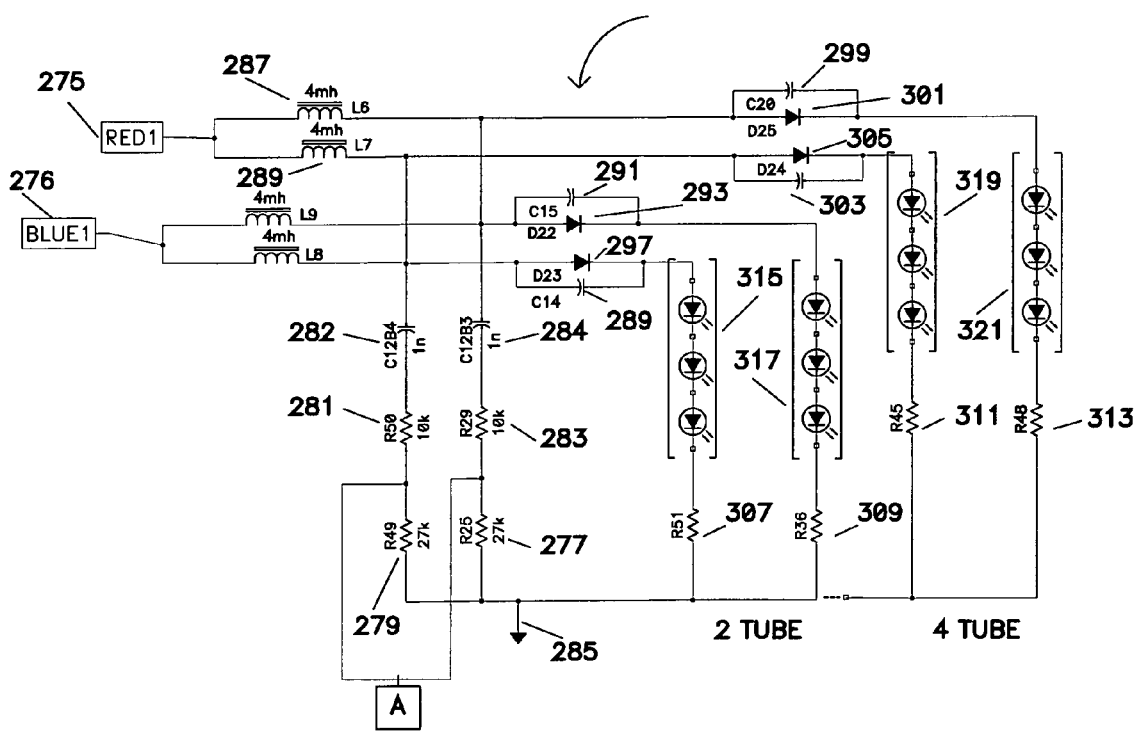

This FIG. 2 diagram 101 is only a portion of the circuitry of this present invention embodiment, as this FIG. 2 circuitry is connected to the FIG. 3 circuitry, which is in turn connected to the FIG. 4 circuitry. This FIG. 1 circuitry includes input connections, fuse, voltage control and power factor control, as well as other features. The specific components are arranged as shown and their specific types and values are shown in Table 1 below:

TABLE 1

The FIG. 2 Section Components

| Reference | Item | Value | Units |
|---|---|---|---|
| 103 | A.C. Input Line | 120 v | L1 |
| 105 | A.C. Input Line | 120 v | L2 |
| 107 | Resistor | 100K | ⅛ w |
| 109 | Capacitor | .01 uf | 50 v |
| 111 | Capacitor | 100 uf | 50 v |
| 115 | Diode | 1N4937 | D2 |
| 117 | Diode | 1N4937 | D1 |
| 119 | Resistor | 100K | ⅛ W |
| 121 | Plug TAP | Connection | G |
| 123 | PEPI | PEPI | VR2 |
| 125 | Resistor | 125K | ⅛ W |
| 127 | Diode | 1N4937 | 18 V |
| 129 | MOSFET gate driver | BS170 | Q3 |
| 131 | Battery connection | 12 V | TB2PN |
| 133 | Resistor | 2.5K | 1.8 W |
| 137 | Regulator chip | 12 v | U10 |
| 139 | Resistor | 82 ohm | 1/8 w |
| 141 | Resistor | 1.8k | 1/8 w |
| 143 | Capacitor | 470 uf | C21 |
| 145 | Plug | 16 Pin | P2 |
| 147 | Plug TAP | Connection | G |
| 149 | Capacitor | .68 uf | 450 v |
| 151 | Ground analog | Connection | G |
| 153 | Power Input | White | |
| 155 | Metal Oxide Varistor | ZNR112u | VAR2 |
| 157 | Capacitor Resistor | .033 uf | C4 |
| 159 | Induction Transformer | Sensing | T2 |
| 161 | Output Transformer | Power | L2 |
| 163 | Diode | 1N4148 | D12 |
| 165 | Diode Resistor | 1N4148 | D13 |
| 167 | Diode Resistor | 1N4148 | D14 |
| 169 | Diode Resistor | 1N4148 | D15 |
| 171 | Capacitor | .1 uf | C7 |
| 173 | Capacitor | .1 uf | C6 |
| 175 | Resistor | 1.3k | R10 |
| 177 | Fluorescent lamp connection/lamp | Red | Lamp |
| 179 | Fluorescent lamp connection/lamp | Blue | Lamp |
| 181 | half bridge MOSFET Driver | IR2112c | U4 |
| 183 | Resistor | 20 ohm | R26 |
| 185 | MOSFET | IRFP450U | Q1 |
| 187 | Resistor | 20 ohm | R27 |
| 189 | Resistor | 20 ohm | R28 |
| 191 | MOSFET | IRFP450U | Q2 |
| 193 | Capacitor | .1 uf | C18 |
| 195 | Diode | 1N44937 | D20 |
| 197 | Resistor | 10k | R18 |
| 199 | Resistor | 10k | R19 |
| 201 | Plug | Connection | K |
| 203 | Plug | Connection | J |
| 352 | 12 Volt rechargeable battery | | |

In FIG. 2, at the end of the circuitry segment schematic diagram 101a are figure connectors A, B, C, D and E. Thus, B, C, D and E connectors here match up to connectors B, C, D and E of FIG. 3, and A here matches up with connector A of FIG. 4. Thus, these three Figures should be taken together a one full circuitry arrangement for a preferred present invention embodiment.

Referring now to FIG. 3, a schematic diagram 101b shows details of a second segment of a preferred embodiment of the present invention, wherein the first segment is set forth in FIG. 2 above and the third segment is presented in FIG. 4 below. This middle segment shows various essential features and highlights most of the current sensing and current adjustment aspects of the invention. The specific components are arranged as shown and their specific types and values are shown in Table 2 below:

TABLE 2

The FIG. 3 Section Components

| Reference | Item | Value | Units |
|---|---|---|---|
| 205 | Plug | Connection | A |
| 207 | Capacitor | 1 uf | C30 |
| 209 | Resistor | 10k | R31 |
| 211 | Resistor | 4.7k | R32 |
| 213 | Resistor | 10k | R30 |
| 215 | Resistor | 3.3M | R33 |
| 217 | Amplifier | LM393n | U2 |
| 219 | Resistor | 10k | R34 |
| 221 | Capacitor | 1 uf | C31 |
| 223 | Capacitor | .01 uf | C37 |
| 225 | Capacitor | 1 uf | C32 |
| 227 | Resistor | 499k | R35 |
| 229 | Timer | LM555C | U7 |
| 231 | Power-low | +12 v | |
| 233 | Resistor | 1M | R37 |
| 235 | Capacitor | .047 uf | C33 |
| 237 | Resistor | 2.2M | R39 |
| 239 | Resistor | 2.2M | R38 |
| 241 | Resistor | 3.3M | R40 |
| 243 | Plug | Connection | L |
| 245 | Resistor | 499k | R41 |
| 247 | Amplifier | LM393n | U2 |
| 249 | Transistor | 2n3904 | Q7 |
| 251 | Transistor | 2n3904 | Q6 |
| 253 | Transistor | 2n3904 | Q5 |
| 255 | Resistor | 1.5k | R44 |
| 257 | Resistor | 10k | R42 |
| 259 | Resistor | 10k | R47 |
| 261 | Resistor | 1k | R46 |
| 267 | Capacitor Resistor | 3.3 uf | C3 |
| 269 | Ground analog | | |
| 271 | Capacitor | .01 uf | C36 |
| 273 | Timer | LM555CJ | U8 |
| 340 | Pulse Width Modulator (PWM) chip | Lm357u | U3 |
| 342 | Capacitor | .1 uf | C9 |
| 344 | Capacitor | 1000 pf | C12 |
| 346 | Variable Resistor | 50k | R7 |
| 348 | Ground analog | | |
| 350 | Capacitor | 10 uf | C17 |
| 352 | 12 Volt | 12 v | |

In FIG. 3, the items numbered as items 205 through 247, also identified above in Table 2, constitute a zeta scan component. It is essential to some of the preferred embodiments of the present invention, but not to others. For example if the zeta scan is taken out of the schematics shown in the FIGS. 2 through 4, the resulting driver is still within the scope of the invention, as it will still drive different sizes and types of lamps and is adaptable an responsive to the functions described above, including recognizing lamp current sensed changes and corrective measures. The zeta scan adds additional features, including the ability to pre-program or connect to a programmer (e.g. a smart phone or lap top, wirelessly or wired) and actually change wavelengths, sequences, frequencies and periodicities of individual lamps.

Referring now to FIG. 4, a schematic diagram 101c shows details of a third segment of a preferred embodiment of the present invention, wherein the first segment is set forth in FIG. 2 above and the second segment is presented in FIG. 3 above. FIG. 2 connector A connects to the FIG. 4 circuitry (connector A). This end segment shows various essential features and highlights most of the output and feedback portions of the invention. The specific components are arranged as shown and their specific types and values are shown in Table 3 below:

TABLE 3

The FIG. 4 Section Components

| Reference | Item | Value | Units |
|---|---|---|---|
| 275 | Plug | Red1 | |
| 277 | Resistor | 27k | R25 |
| 279 | Resistor | 27k | R49 |
| 281 | Resistor | 10k | R50 |
| 282 | Capacitor | 1n | C12B4 |
| 283 | Resistor | 10k | R29 |
| 284 | Capacitor | 1n | C12B3 |
| 285 | Ground analog | | |
| 287 | Inverter Transformer (Choke) | 4 mh | L6 |
| 289 | Inverter Transformer (Choke) | 4 mh | L9 |
| 291 | Capacitor | .1 u | C15 |
| 293 | Diode | 1n4148 | D22 |
| 298 | Capacitor | .1 u | C14 |
| 297 | Diode | 1n4148 | D14 |
| 299 | Capacitor | .1 u | C2 |
| 301 | Diode | 1n4148 | D25 |
| 303 | Capacitor | .1 u | C21 |
| 305 | Diode | 1n4148 | D24 |
| 307 | Resistor | 20 ohm | R51 |
| 309 | Resistor | 20 ohm | R36 |
| 311 | Resistor | 20 ohm | R45 |
| 313 | Resistor | 20 ohm | R48 |
| 315 | First LED Lamp | | |
| 317 | Second LED Lamp | | |
| 319 | Third LED Lamp | | |
| 321 | Fourth LED Lamp | | |

The details shown may be modified to be consistent with the arrangements and purposes set forth herein above and below, without exceeding the scope of the present invention. Thus, the LED lamps could be fluorescent lamps, ultraviolet lamps, infrared lamps or other solid state or gas filled lamps. For example, the values of the various specific components could be adjusted up or down until less than desirable functionality is achieved. Printed chips might replace some of the components if the inputs, outputs and functions are the same. The power factor correction chip could be supplanted by individual pre-chip components; the positioning of the power factor correction circuitry could be rearranged (positioned elsewhere in the circuit) in a different loop and still make corrections as needed. However, other aspects, such as the interlopers of the dedicated transformers, are essential in that position (between the transformers and the lamp receptacles).

The present invention can achieve great energy savings in office buildings, schools, hospitals and industrial plants or any other location where there are large banks of lights. Not only does this type of application where there are so many lamps benefit from great energy savings, but it benefits from the ability to remotely and precisely control the output of the lamps and will greatly benefit from the long life of the lamps. Also, since not all lamps in such a location will necessarily be of the same type, the user will benefit from the ability to interchange bulb types with differing wattages and other aspects, without rewiring or modification.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A variable control, current sensing electronic driver for providing light from different size and intensity gas-based light bulbs and solid state lamps, wherein said driver is programmable and auto-adjustable for different wattages to permit use with said different size and intensity gas-based light bulbs and solid state lamps therewith, said driver having power factor correction, surge protection, current sensing with current adjustment, and dimming capabilities, comprising:

(a) a housing unit to mount electronic circuitry and related components;
(b) said electronic circuitry mounted on said housing unit, which includes:
 (i) connection means for connecting and applying a.c. power input to said circuitry;
 (ii) user control means for switching lamps on and off and dimming, thereby controlling said circuitry;
 (iii) rectifying circuitry to convert a.c. power input to a plurality of d.c. outputs, including one or more low voltage outputs, and including a doubler circuit for generation of high frequency voltages;
 (iv) buck connector that includes a wave-shaping induction transformer component, with power factor correction circuitry, including at least one power factor correction chip;
 (v) comparator circuitry which receives an external control signal and compares it to feedback from the output side of the circuitry, and thereby controls a Pulse Width Modulation (PWM) circuitry;
 (vi) said PWM circuitry which sends at least timing and frequency signals to a MOSFET gate driver circuit, and said PWM circuitry being functional to respond to dimming input of said user control means;
 (vii) said MOSFET gate driver circuit which receives said timing signal from PWM circuitry and supplies switching control to at least two secondary MOSFETs;
 (viii) said at least two secondary MOSFETs, which receive d.c. power from said rectifying circuitry and its doubler circuit and which are controlled by said MOSFET gate driver circuitry to output high frequency voltages;
 (ix) at least one isolation transformer, selected from the group consisting of a gas-bulb dedicated isolation transformer, a solid state lamp isolation transformer, and combinations thereof, with the outputs of said MOSFETs connected to inputs to said at least one transformer for driving at least one corresponding lamp;
 (x) at least one diode and one resistor located between said at least one isolation transformer and a single lamp receptacle connection to which it is dedicated; and,
 (xi) lamp sensing circuitry receiving input from said rectifying circuitry to detect lamp wattage and to also having a fault detector with a shut-down to separately detect lamp outage, and connected to adjustment circuitry to adjust for both wattage size and lamp outage, said lamp sensing circuitry to adjust power as needed to recognize and adjust to wattage requirements of different lamp sizes, and separately to at least partially decrease power when at least one lamp is experiencing outage.

2. The enhanced variable control, current sensing electronic driver of claim 1, further compromising means to remotely control said switching on and off.

3. The enhanced variable control, current sensing electronic driver of claim 2, further compromising means to remotely control the driver such that said lamps may be dimmed by controlling the PWM circuitry, which controls timing and frequency.

4. The enhanced variable control, current sensing electronic driver of claim 3, further compromising means to control the driver by a programmable timer and dimmer.

5. The enhanced variable control, current sensing electronic driver of claim 1 wherein each of said power factor correction circuitry and said current sensing circuitry has at least one ground connected thereto.

6. The enhanced variable control, current sensing electronic driver of claim 1 wherein said at least one isolation transformer is a solid state lamp-dedicated isolation transformer, which receives d.c. power from said rectifying circuit, and which is controlled by said MOSFET gate driver circuit.

7. The enhanced variable control, current sensing electronic driver of claim 6 wherein there is a solid state receptacle that is connected to said solid state dedicated isolation transformer, and said at least one diode and one resistor is located between said solid state dedicated isolation transformer and said solid receptacle.

8. The enhanced variable control, current sensing electronic driver of claim 7 wherein said solid state receptacle contains an LED lamp.

9. The enhanced variable control, current sensing electronic driver of claim 1 wherein said isolation transformer is a gas-bulb dedicated isolation transformer, a gas bulb receptacle is connected to said gas-bulb dedicated isolation transformer, and said at least one diode and one resistor is located between said gas-bulb dedicated isolation transformer and said gas bulb receptacle.

10. The enhanced variable control, current sensing electronic driver of claim 9 wherein said gas bulb receptacle contains a fluorescent bulb.

11. The enhanced variable control, current sensing electronic driver of claim 9 wherein said gas bulb receptacle contains an ultraviolet bulb.

12. The enhanced variable control, current sensing electronic driver of claim 9 wherein said gas bulb receptacle contains an infrared bulb.

13. The enhanced variable control, current sensing electronic driver of claim 1 which further includes an in-driver rechargeable 12 volt battery, alternating current power failure recognition, and 12 volt switch responsive to sensing alternating current power failure for 12 volt powering.

14. The electronic driver for providing light from visible light bulbs and non-visible light bulbs, of claim 1 which further includes a zeta scan component connected to said electronic circuitry mounted on said housing unit.

15. The electronic driver for providing light from visible light bulbs and non-visible light bulbs, of claim 14 wherein said zeta scan component includes:
  (i) connection means for connecting and applying a.c. power input to said zeta scan component;
  (ii) at least one frequency and time controller;
  (iii) at least one input comparator connected to said time and frequency controller;
  (iv) at least one output comparator connected to said time and frequency controller; and, (v) a plurality of resistors and capacitors situated between said input comparator and said time and frequency controller, and at least one resistor and at least one capacitor situated between said time and frequency controller and said input comparator.

16. The electronic system for providing light of claim 15, further compromising means to remotely control said switching on and off.

17. The electronic system for providing light of claim 16, further compromising the means to remotely control the driver such that said lamps may be dimmed by controlling the PWM circuitry.

18. The electronic system for providing light of claim 16, further compromising means to control the driver by a programmable timer and dimmer.

19. The electronic system for providing light of claim 15 wherein each of said power factor correction circuitry and said current sensing circuitry has at least one ground connected thereto.

20. The electronic system for providing light of claim 10 wherein there are two isolation transformers, one of which is a gas-bulb dedicated isolation transformer, a gas bulb receptacle is connected to said gas-bulb dedicated isolation transformer, and said at least one diode and one resistor is located between said gas-bulb dedicated isolation transformer and said gas bulb receptacle, and one of which is a solid state dedicated isolation transformer, and a solid state receptacle is connected to said solid state dedicated isolation transformer, and said at least one diode and one resistor is located between said solid state dedicated isolation transformer and said solid receptacle.

* * * * *